United States Patent
Li et al.

(10) Patent No.: US 10,068,601 B1
(45) Date of Patent: Sep. 4, 2018

(54) FREE LAYER ONLY MAGNETIC READER THAT MAY HAVE A REDUCED SHIELD-TO-SHIELD SPACING AND A MULTILAYER SIDE BIAS

(71) Applicant: Western Digital (Fremont), LLC, Fremont, CA (US)

(72) Inventors: Shaoping Li, San Ramon, CA (US); Shihai He, Fremont, CA (US); Gerardo A. Bertero, Redwood City, CA (US); Ming Mao, Dublin, CA (US); Yuankai Zheng, Fremont, CA (US); Anup Ghosh Roy, Fremont, CA (US); Chen-Jung Chien, Mountain View, CA (US); Zhihong Zhang, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 15/232,669

(22) Filed: Aug. 9, 2016

(51) Int. Cl.
*G11B 5/39* (2006.01)
*G11B 5/60* (2006.01)

(52) U.S. Cl.
CPC .......... *G11B 5/6082* (2013.01); *G11B 5/3906* (2013.01); *G11B 5/3912* (2013.01); *G11B 5/3932* (2013.01)

(58) Field of Classification Search
CPC .... G11B 5/3906; G11B 5/3912; G11B 5/3932
USPC ................................ 360/319, 324.11, 324.12
See application file for complete search history.

(56) References Cited

U.S. PATENT DOCUMENTS

| 8,514,525 | B2 | 8/2013 | Childress | |
|---|---|---|---|---|
| 8,531,802 | B2* | 9/2013 | Tsoukatos | G11B 5/3932 360/319 |
| 8,576,518 | B1* | 11/2013 | Zeltser | G11B 5/3912 360/319 |
| 8,630,068 | B1* | 1/2014 | Mauri | G11B 5/3909 360/319 |
| 8,879,213 | B2* | 11/2014 | Isowaki | G11B 5/3163 360/319 |
| 9,019,664 | B2* | 4/2015 | Song | G11B 5/3912 360/319 |
| 9,076,468 | B1* | 7/2015 | Keener | G11B 5/3932 |
| 9,123,886 | B2* | 9/2015 | Zhang | H01L 43/12 |
| 9,190,081 | B2* | 11/2015 | Aoyama | G11B 5/3912 |

(Continued)

*Primary Examiner* — Jefferson Evans
(74) *Attorney, Agent, or Firm* — Foley & Lardner LLP

(57) ABSTRACT

A magnetic read apparatus includes a media-facing surface (MFS), a sensor, a shield structure, a side bias structure, and a shield reference bias structure. The sensor includes a free layer and a nonmagnetic layer. The shield structure includes a shield pinning structure and a shield reference structure between the shield pinning structure and the nonmagnetic layer. The nonmagnetic layer is between the free layer and a shield reference structure. The shield pinning structure includes a pinned moment oriented in a first direction. The shield reference structure includes a reference structure moment weakly coupled with the pinned moment. The side bias structure is adjacent to a side of the free layer and biases the free layer in a first direction parallel to the MFS. The shield reference bias structure is adjacent to the shield reference structure and biases the shield reference structure in a direction opposite to the first direction.

19 Claims, 7 Drawing Sheets

(56) References Cited

U.S. PATENT DOCUMENTS

| | | | |
|---|---|---|---|
| 9,230,576 B1 | 1/2016 | Gill | |
| 9,230,577 B2 * | 1/2016 | Zhang | G11B 5/3932 |
| 9,269,383 B1 | 2/2016 | Hattori | |
| 9,390,735 B1 * | 7/2016 | Wang | G11B 5/3912 |
| 9,928,857 B2 * | 3/2018 | Singleton | G11B 5/115 |
| 2002/0131215 A1 * | 9/2002 | Beach | B82Y 10/00 |
| | | | 360/324.2 |
| 2005/0190508 A1 * | 9/2005 | Gill | G11B 5/1272 |
| | | | 360/324.1 |
| 2005/0243475 A1 * | 11/2005 | Heim | B82Y 10/00 |
| | | | 360/324.11 |
| 2007/0217082 A1 * | 9/2007 | Lin | B82Y 10/00 |
| | | | 360/324.11 |
| 2008/0316657 A1 * | 12/2008 | Zhang | B82Y 10/00 |
| | | | 360/324.11 |
| 2011/0051291 A1 * | 3/2011 | Miyauchi | B82Y 10/00 |
| | | | 360/245.3 |
| 2011/0279923 A1 * | 11/2011 | Miyauchi | B82Y 10/00 |
| | | | 360/75 |
| 2012/0087045 A1 * | 4/2012 | Yanagisawa | B82Y 25/00 |
| | | | 360/294 |
| 2012/0327537 A1 * | 12/2012 | Singleton | G11B 5/3912 |
| | | | 360/244 |
| 2014/0177102 A1 | 6/2014 | Kief | |
| 2015/0092303 A1 * | 4/2015 | Aoyama | G11B 5/11 |
| | | | 360/319 |
| 2015/0098155 A1 * | 4/2015 | Lapicki | G01R 33/093 |
| | | | 360/319 |
| 2015/0325260 A1 * | 11/2015 | Singleton | G11B 5/3912 |
| | | | 360/319 |
| 2015/0332713 A1 * | 11/2015 | Du | G11B 5/3912 |
| | | | 360/319 |
| 2017/0011759 A1 * | 1/2017 | Ge | G11B 5/3932 |
| 2017/0033278 A1 * | 2/2017 | Lapicki | H01L 43/08 |
| 2017/0249959 A1 * | 8/2017 | Bertero | G11B 5/39 |

\* cited by examiner

FREE LAYER ONLY MAGNETIC READER THAT MAY HAVE A REDUCED SHIELD-TO-SHIELD SPACING AND A MULTILAYER SIDE BIAS

BACKGROUND

FIG. 1 depicts an air-bearing surface (ABS) view of a read apparatus used in magnetic recording technology applications. The read apparatus 10 includes shields 12 and 18, insulator 14, magnetic bias structures 16, and sensor 20. The read sensor 20 is typically a giant magnetoresistive (GMR) sensor or tunneling magnetoresistive (TMR) sensor. The read sensor 20 includes an antiferromagnetic (AFM) layer 22, a pinned layer 24, a nonmagnetic spacer layer 26, and a free layer 28. Also shown is a capping layer 30. In addition, seed layer(s) may be used. The free layer 28 has a magnetization sensitive to an external magnetic field. Thus, the free layer 28 functions as a sensor layer for the magnetoresistive sensor 20. If the sensor 20 is to be used in a current perpendicular to plane (CPP) configuration, then current is driven in a direction substantially perpendicular to the plane of the layers 22, 24, 26, and 28. The magnetic bias structures 16 are used to magnetically bias the free layer 28.

Although the read apparatus 10 functions, there are drawbacks. The trend in magnetic recording is to higher density memories. For higher linear densities, the shield-to-shield spacing, SS, and the track width are both desired to be reduced. The shield-to-shield spacing for the read apparatus is on the order of twenty-two nanometers or more. The read sensor 20 may not adequately read high linear density media. Accordingly, what is needed is a system and method for improving the performance of a magnetic recording read apparatus at higher linear densities.

DETAILED DESCRIPTION OF THE PREFERRED EMBODIMENTS

While the various embodiments disclosed are applicable to a variety of data storage devices such as magnetic recording disk drives, solid-state hybrid disk drives, networked storage systems etc., for the sake of illustration the description below uses disk drives as examples.

Figure 1:
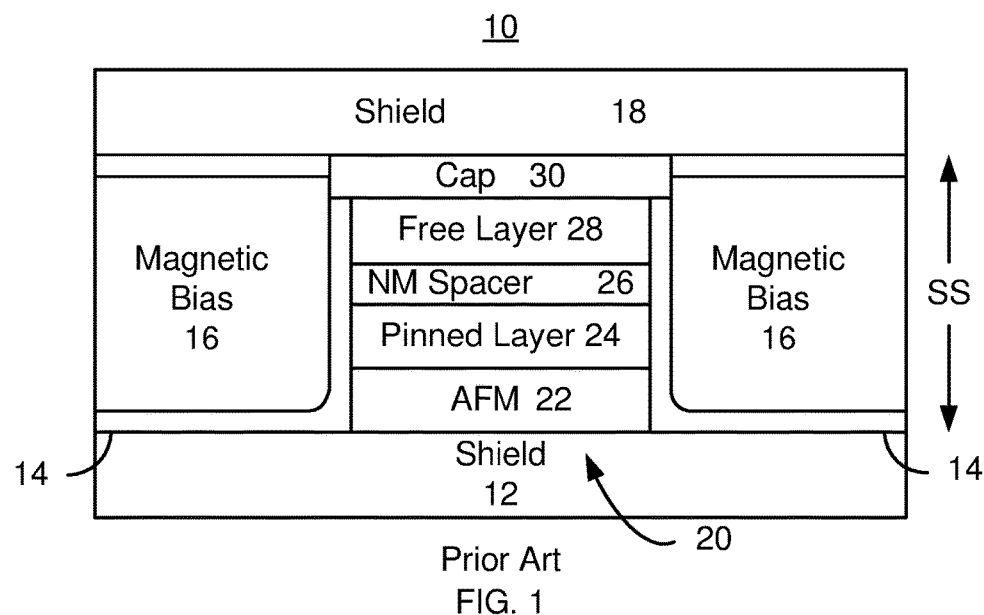
FIG. 1 depicts an ABS view of a conventional magnetic recording read apparatus.
Figure 2A:
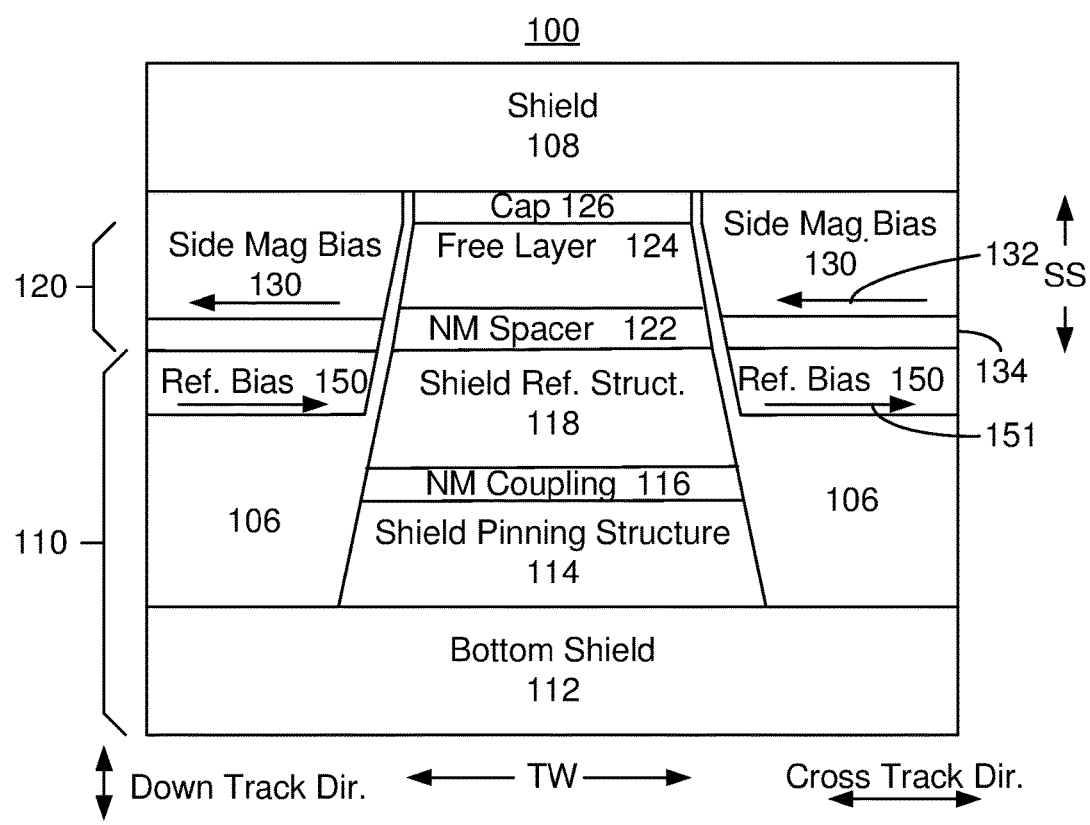
FIGS. 2A and 2B depict MFS and top views of an exemplary embodiment of a magnetic read apparatus.
Figure 2B:
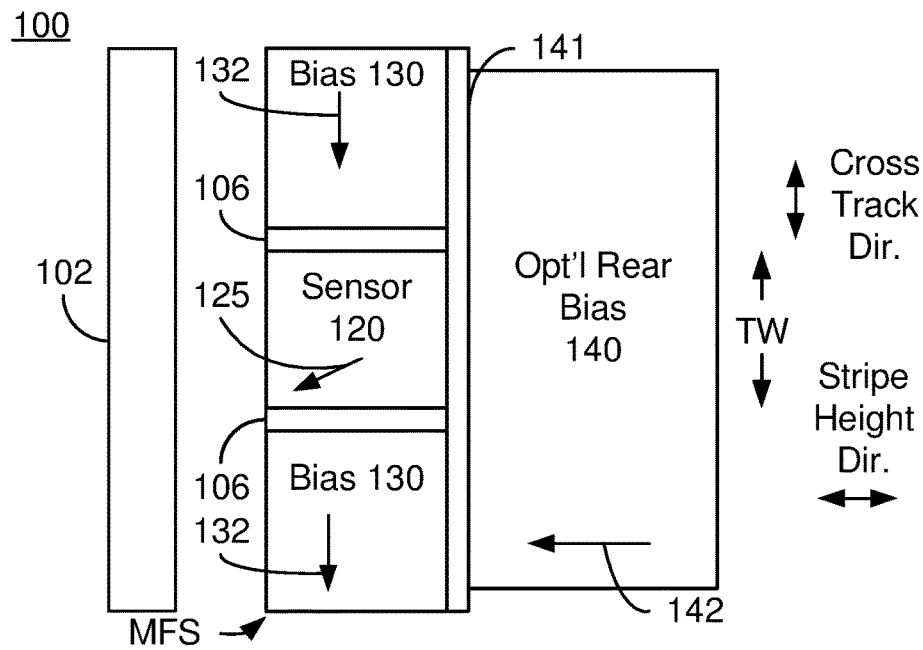

FIGS. 2A and 2B depict media-facing surface (MFS) and top views of an exemplary embodiment of a portion of a read apparatus 100 that is part of a data storage device. For clarity, FIGS. 2A and 2B are not to scale. In the embodiment shown, the read apparatus 100 may be part of a disk drive. Therefore, the MFS may be an air-bearing surface (ABS). In some embodiments, the MFS is a different gas-bearing surface, e.g. helium. For simplicity not all portions of the read apparatus 100 are shown. In addition, although the read apparatus 100 is depicted in the context of particular components other and/or different components may be used. For example, circuitry used to drive and control various portions of the read apparatus 100 is not shown. Although not shown, the slider on which the read apparatus 100 is formed is generally attached to a suspension (not shown). In general, the data storage device includes the read apparatus 100 and a write apparatus (not shown). For clarity, only the read apparatus 100 is shown. For simplicity, only single components are shown. However, multiples of each components and/or and their sub-components, might be used.

The read apparatus 100 includes a MFS that is proximate to the media 102 during use in a disk drive. The read apparatus 100 includes a shield structure 110, a read sensor 120, side bias structures 130, shield reference bias structures 150 and top shield 108. In some embodiments, an optional rear bias structure 140 may also be provided. In such embodiments, a nonmagnetic insulating layer 141 may be provided between at least the read sensor 120 and the rear bias 140. Also shown are nonmagnetic layers 106. In some embodiments, the nonmagnetic layers 106 are insulating layers. Although not shown, in other embodiments, additional read sensor(s) and associated structures may be included as part of the read apparatus 100.

The top shield 108 may be a monolithic (single layer) shield or a multilayer. For example, the top shield 108 may be a layer of NiFe. Alternatively, the top shield 108 may be an antiferromagnetically coupled shield including multiple ferromagnetic layers that are antiferromagnetically coupled to one another. In such embodiments, the top shield 108 may include nonmagnetic layer(s) between the ferromagnetic layers and/or an antiferromagnetic (AFM) layer adjacent to one of the ferromagnetic layers. The capping layer 126 may separate the top of the read sensor 120 from the top shield 108. The capping layer 126 may also be a single layer or a multilayer. In other embodiments, the capping layer 126 might be omitted.

The shield structure 110 includes an optional bottom shield 112, a shield pinning structure 114 and a shield reference structure 118. The shield pinning structure 114 may be separated from the shield reference structure 118 by a nonmagnetic coupling layer 116. The nonmagnetic coupling layer 116 may be used to mediate the coupling between the structures 114 and 118. In some embodiments, the nonmagnetic layer is a Ru layer used to antiferromagnetically couple the structures 114 and 118. A magnetic moment of the shield reference structure 118 is weakly magnetically coupled with a magnetic moment of the shield pinning structure 114. In some embodiments, a magnetic seed structure (not shown) may be provided between the shield pinning structure 114 and the bottom shield 112. Such a magnetic seed structure may provide a template for growth of the desired crystal structure for subsequent layer(s).

The shield pinning structure 114 may have its magnetic moment(s) strongly pinned, or fixed, in place. For example, the shield pinning structure 114 may include an AFM layer and a ferromagnetic layer exchanged coupled to the AFM layer. This exchange coupling is generally relatively strong. The magnetic moment(s) of the shield pinning structure 114 may not be responsive to an external field, for example a field due to a media 102. In contrast, the bottom shield 112 may have magnetic moment(s) that do respond to an external magnetic field.

The shield reference structure 118 includes at least one ferromagnetic layer. In some embodiments, the shield reference structure 118 includes multiple ferromagnetic layers interleaved with and sandwiching nonmagnetic layer(s). In other embodiments, a single ferromagnetic layer might be used. Other configurations are possible. In some embodiments, the thickness(es) of the ferromagnetic layers are at least two nanometers and not more than ten nanometers. However, the ferromagnetic layer closest to the shield pinning structure 114 may be thicker. For example, this ferromagnetic layer may have a thickness of at least three nanometers and not more than twenty nanometers. The thickness(es) of the nonmagnetic layer(s) within the shield reference structure 118 may be selected so that the ferromagnetic layers are antiferromagnetically coupled via a Ruderman-Kasuya-Kittel-Yosida (RKKY) interaction.

The shield reference structure 118 may act as a reference layer for the magnetoresistance of the read sensor 120 and act as a shield. This is because the magnetic moment(s) of the shield reference structure 118 may be considered to be partially pinned and partially free. The magnetic moments of the ferromagnetic layers within the shield reference structure 118 may be strongly coupled to each other. In some embodiments, the ferromagnetic layers are antiferromagnetically coupled with a characteristic magnetic field strength of at least eight hundred and not more than two thousand Oe. For example, the shield reference structure may include two ferromagnetic layers (termed first and second reference layers) and a nonmagnetic layer between the two reference layers. The first reference layer adjoins the nonmagnetic spacer layer 122. The first reference layer may have a thickness of at least two nanometers and not more than four nanometers. The second reference layer may have a thickness of at least five nanometers and not more than seven nanometers. Either or both of these reference layers may be a multilayer.

The magnetic coupling between the shield reference structure 118 and the shield pinning structure 114 is less than the magnetic coupling between the layers within the shield reference structure 118. For example, the shield reference structure 118 may be coupled with the shield pinning structure 114 with a characteristic field strength of at least three hundred Oe and not more than one thousand five hundred Oe.

Although strongly coupled to each other, the magnetic moments of the shield reference structure 118 are not strongly fixed in place by a coupling with the shield pinning structure 114. Stated differently, the magnetic moments of the shield reference structure 118 are not completely pinned. Instead, the magnetic moments of the shield reference structure 118 are partially pinned. For example, the shield reference structure 118 may have a permeability of at least five and not more than eight hundred. The magnetic moments of the shield reference structure 118 may be at least somewhat responsive to an external magnetic field. However, the magnetic moment(s) of the shield reference structure 118 are sufficiently fixed that a GMR or TMR may be developed between the free layer 124 and the shield reference structure 118.

The read sensor 120 includes a free layer 124 and a nonmagnetic spacer layer 122. An optional capping layer 126 may also be present. The nonmagnetic spacer layer 122 may be a conductive layer or an insulating tunneling barrier layer, such as MgO. The free layer 124 is ferromagnetic and may include multiple layers. Thus, the only magnetic layer(s) for the read sensor 120 may be (or be within) the free layer 124. The read sensor 120 may thus be termed a "free layer only" read sensor 120. The difference in orientation between the magnetic moment(s) 125 of the free layer 124 and the magnetic moment of a top ferromagnetic layer (not shown) of the shield reference structure 118 gives rise to a magnetoresistance. The read sensor 120 is, therefore, a giant magnetoresistive (GMR) or tunneling magnetoresistive (TMR) read sensor in the embodiment shown. The resistance of the read sensor 120 may be used to read data. The read sensor 120 may also be configured for high density recording. Thus, in some embodiments, the track width (TW) of the read sensor 120 may be small. For example, the track width may be not more than twenty-five nanometers.

The optional rear bias structure 140 may include hard magnetic material(s) and/or soft magnetic materials. In some embodiments, the nonmagnetic insulator 141 separates the sensor 140 and magnetic bias structures 130 from the rear bias structure 140. The rear bias structure 140 may be used to provide a magnetic bias that is perpendicular to the MFS. In the embodiment shown in FIG. 2B, this magnetic bias is provided by magnetic moment 142 and is sufficiently large that the free layer magnetic moment 125 is canted from the cross-track direction. Although shown with a particular height in the stripe height direction and a particular width in the cross-track direction, the optional rear bias structure 140 may have other dimensions. For example, the rear bias structure 140 may be only as wide as the sensor 120.

The side magnetic bias structures 130 may take various forms. The read sensor 120 may be separated from the side magnetic bias structures 130 by insulator 106. In some embodiments, both the magnetic bias structures 130 are soft magnetic layers. For example, the magnetic bias structures 130 may include CoFe and/or NiFe. In other embodiments, the magnetic bias structures 130 may be hard bias structures. For example, the magnetic bias structures 130 may be an alloy or multilayer that has a sufficiently high coercivity to have its magnetic moment substantially unchanged during operation of the magnetic read apparatus 100. In other embodiments, the magnetic bias structures 130 have another structure. The magnetic moments 132 of the magnetic bias structures 130 are shown parallel to the cross track direction. The magnetic moments 132 magnetically bias the read sensor magnetic moment 125 in the cross track direction. However, in other embodiments, the magnetic moments 132 of the magnetic bias structures 130 may magnetically bias the free layer 124 in another direction. In some embodiments, although the magnetic moments 132 of the magnetic bias structures 130 magnetically bias the free layer 124 in the cross-track direction, the equilibrium (zero external field) position of the free layer magnetic moment 125 may be canted from the cross-track direction as shown in FIG. 2B. In other embodiments, the equilibrium position of the free layer magnetic moment 125 may be in the cross-track direction.

The shield reference bias structures 150 are adjacent to the shield reference structure 118. The shield reference bias structures 150 magnetically bias at least part of the shield reference structure 118. Further, the shield reference bias structures 150 bias some or all the shield reference structure 118 in the opposite direction from which the side magnetic bias structures 130 bias the free layer 124. For example, in the embodiment shown, each of the side magnetic bias structures 130 has a magnetic moment 132 in one direction parallel to the cross-track direction. Each of the shield reference bias structures 150 has a magnetic moment 151 that is antiparallel to the magnetic moment 132 of the side magnetic bias structures 130. The magnetic moment 151 provides a magnetic bias in the opposite direction to that of the magnetic moment 132. In some embodiments, the magnetic moments 132 and 151 are antiferromagnetically coupled. Although the shield reference bias structures 150 magnetically bias the shield reference structure 118 in a direction along the cross-track direction and antiparallel to the moment 132, the equilibrium (zero external magnetic field) position of the moment of the shield reference structure 118 magnetic moment(s) need not be along the cross-track direction. In some embodiments, the magnetic moment(s) of the shield reference structure 118 are canted from the cross-track direction. For example, the magnetic moment(s) of the shield reference structure 118 may be forty-five degrees from the MFS. In other embodiments, however, the magnetic moment(s) of the shield reference structure 118 are along the cross-track direction. Further, although depicted as a single layer having a magnetic moment 151 in a single direction, shield reference bias structure 150 may include multiple magnetic moments in multiple directions and/or multiple layers. For example, the shield reference bias structures 150 may each include multiple magnetic bias layers separated by and antiferromagnetically coupled through nonmagnetic spacer layers. These magnetic bias layers may be soft magnetic bias layers.

Although not shown in FIGS. 2A and 28, a shield pinning bias structure may be included in the magnetic read apparatus 100. The shield pinning bias structure may be used to magnetically bias the shield pinning structure 114 in the desired direction.

The magnetic read apparatus 100 may be suitable for use at higher linear densities. The magnetic moment(s) of the shield reference structure 118 are partially fixed, while the magnetic moment(s) of the free layer 124 respond to the magnetic field of a bit in the media 102 being read. A characteristic magnetoresistance may be developed for the read sensor 120 depending upon the direction of the field due to the bit being read and, therefore, information stored in the bit. Thus, the magnetic read apparatus 100 is capable of reading data using a single free layer sensor 120. Because the magnetic moment(s) of the shield reference structure 118 also at least partially respond to an external field, the shield reference structure 118 may at least partially shield the free layer 124 from the magnetic field of bits not being read. The shield reference structure 118 may function as a part of a shield. The lower shield for the read apparatus 100 includes more than just the bottom shield 112. Instead, the shield structure 110 (bottom shield 112, shield pinning structure 114 and shield reference structure 118) may act as the lower shield for the read apparatus 100. Consequently, the spacing between the shields 110 and 108 may be reduced to the thickness of the free layer 124, nonmagnetic spacer layer 122 and any capping layer 126. The shield-to shield spacing may be less than fifteen nanometers in some embodiments. In some embodiments, the shield-to-shield spacing may be on the order of ten nanometers or less. Thus, the shield-to-shield spacing of the magnetic read apparatus 100 may be reduced. The presence of the side magnetic bias structure 130 may improve the stability of the free layer 124 and, therefore, the stability of the sensor 120. Biasing of the shield reference structure 118 may be improved because of the presence of the shield reference bias structures 150. Consequently, stability of the shield reference structure 118 may be improved. The combination of the shield reference bias structures 150 and the side magnetic bias structures 130 may be configured to provide the desired biasing of the shield reference structure 118 and free layer 124. The equilibrium point of the read sensor 120 may be tuned using the bias structures 130 and 150. Thus, the desired performance parameters may be better able to be achieved. Further, because the biasing of the structures 118 and 124 is not dependent only upon the thickness of the components of the structures, fabrication may be simplified and larger variations may be allowed. Thus, manufacturing and yield may also be improved. Consequently, the magnetic read apparatus 100 may be suitable for high linear and/or areal density magnetic recording applications, may have improved performance and may have improved manufacturability.

Figure 3:
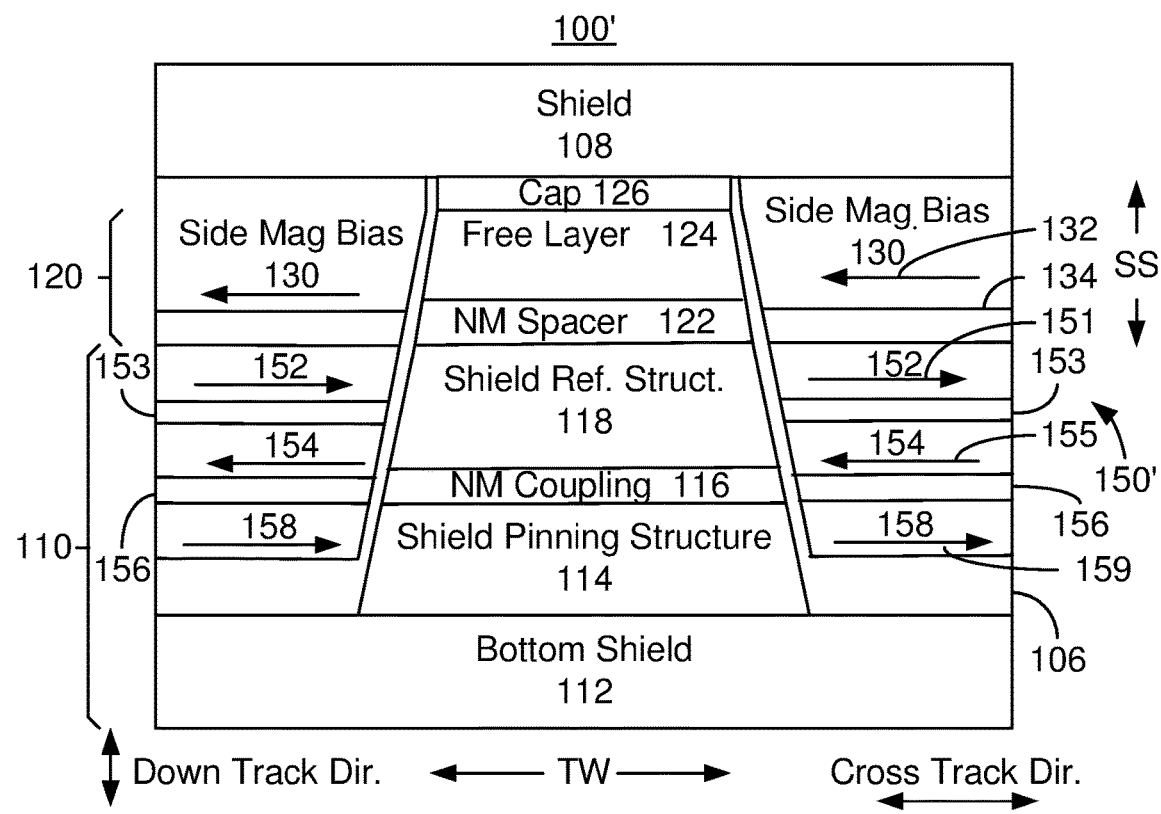
FIG. 3 depicts an MFS view of another exemplary embodiment of a magnetic read apparatus.

FIG. 3 depicts an MFS view of an exemplary embodiment of a portion of a read apparatus 100'. For clarity, FIG. 3 is not to scale. For simplicity not all portions of the read apparatus 100' are shown. In addition, although the read apparatus 100' is depicted in the context of particular components, other and/or different components may be used. For simplicity, only single components are shown. However, multiples of each components and/or and their sub-components, might be used. The read apparatus 100' is analogous to the read apparatus 100. Consequently, similar components have analogous labels. The read apparatus 100' may be contained in a data storage device, such as a disk drive.

The read apparatus 100' includes a shield structure 110, a read sensor 120, insulating layer 106, optional rear bias (not shown), a top shield 108, side magnetic bias structures 130 and shield reference bias structures 150' that are analogous to the read apparatus 100, the read sensor 120, the insulating layer 106, optional rear bias 140, top shield 108, side magnetic bias structures 130 and shield reference bias structure 150, respectively. The read apparatus 100' may also be used in conjunction with media (not shown) that is analogous to the media 102.

The shield structure 110 includes a shield pinning structure 114 and a shield reference structure 118. The shield pinning structure 114 may be separated from the shield reference structure 118 by a nonmagnetic coupling layer 116. The nonmagnetic coupling layer 116 may be used to mediate the coupling between the structures 114 and 118 and may be a Ru layer. In some embodiments, the nonmagnetic coupling layer 141 is configured such that the structures 114 and 118 are AFM coupled.

Each of the shield reference bias structures 150' explicitly include ferromagnetic bias layers 152 and 154 separated by nonmagnetic coupling layer 153. The bias layers 152 and 154 have magnetic moments 151 and 155, respectively. The bias layers 152 and 154 may be termed a first bias layer 152 and a second bias layer 154, respectively. The magnetic moments 151 and 155 are shown as along the cross-track direction. In other embodiments, the magnetic moments 151 and 155 may be canted from the cross-track direction. The thicknesses of the bias layers 152 and 154 may be set based upon the desired moment and/or the desired location of the bias layers 152 and 154. The bias layers 152 and 154 may be soft magnetic layers. For example, the bias layer(s) 152 and 154 may be a NiFe layer and/or a CoFe layer. However, other material(s) may be selected. In addition, one or both of the bias layers 152 and 154 may be a multilayer. The thickness of the nonmagnetic coupling layer 153 is selected such that the bias layers 152 and 154 are antiferromagnetically coupled via an RKKY interaction. The magnetic moments of the bias layers 152 and 154 are strongly coupled. For example, a thickness of the nonmagnetic coupling layer 153 may be selected such that the coupling between the bias layers 152 and 154 is in the first or second antiferromagnetic peak of the RKKY interaction. Because of the presence of two antiferromagnetically coupled bias layers 152 and 154, different portions of the shield reference structures 118 may be biased in opposite directions.

The magnetic read apparatus 100' also includes shield pinning bias structures 158. The magnetic read apparatus 100' may also include nonmagnetic coupling layers 156. In some embodiments, the shield pinning bias structures 158 may be omitted. In other embodiments, the bias layers 154 may be omitted but the shield pinning bias structures 158 included. In the embodiment shown in FIG. 3, both the bias layers 154 and the shield pinning bias structures 158 are present. Each of the shield pinning bias structures 158 has a magnetic moment 159 that is parallel to the moment 151. The shield pinning bias structures 158 may thus magnetically bias the shield pinning structure 114 in the same direction that the moment 151 biases the shield reference structure 118.

The shield pinning bias structures 158 may each be a soft magnetic layer. For example, the shield pinning bias structures 158 may each include a NiFe layer and/or a CoFe layer. However, other material(s) may be selected. In addition, each of the shield pinning bias structures 158 may be a multilayer. The thickness of the nonmagnetic coupling layers 156 is selected such that the bias layers 154 and the shield pinning bias structures 158 are antiferromagnetically coupled via an RKKY interaction. The magnetic moments of the layers 154 and 158 are strongly coupled. For example, a thickness of the nonmagnetic coupling layers 156 may be selected such that the coupling between the layers 154 and 158 is in the first or second antiferromagnetic peak of the RKKY interaction.

The magnetic read apparatus 100' may share at least some of the benefits of the magnetic read apparatus 100. The magnetic read apparatus 100' may be suitable for use at higher linear densities. A characteristic magnetoresistance may be developed between the free layer 124 and the shield reference structure 118. Thus, the magnetic read apparatus 100' is capable of reading data using a single free layer sensor 120. Because the magnetic moment(s) of the shield reference structure 118 also at least partially respond to an external field, the shield structure 110 may function as a shield. Consequently, the shield-to-shield spacing of the magnetic read apparatus 100' may be reduced. The presence of the side magnetic bias structures 130 and shield reference bias structures 150' may improve the stability of the sensor 120 and shield reference structure 118. The equilibrium point of the read sensor 120 may be tuned using the bias structures 130, 150' and 158. Thus, the desired performance parameters may be better able to be achieved. Manufacturing and yield may also be improved. Consequently, the magnetic read apparatus 100' may be suitable for high linear and/or areal density magnetic recording applications, may have improved performance and may have improved manufacturability.

Figure 4:
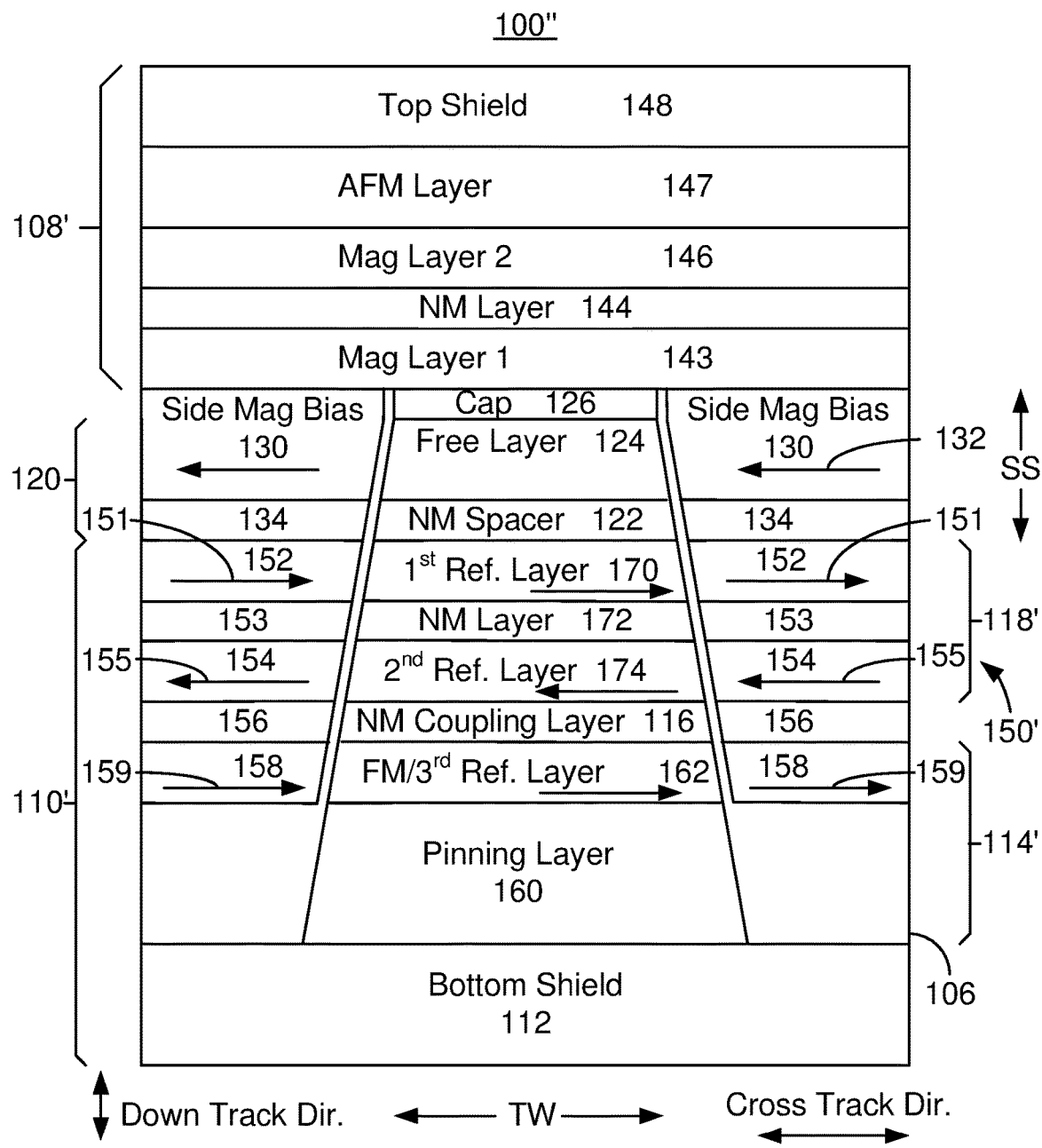
FIG. 4 depicts an MFS view of another exemplary embodiment of a magnetic read apparatus.

FIG. 4 depicts an MFS view of an exemplary embodiment of a portion of a read apparatus 100". For clarity, FIG. 4 is not to scale. For simplicity not all portions of the read apparatus 100" are shown. In addition, although the read apparatus 100" is depicted in the context of particular components other and/or different components may be used. For simplicity, only single components are shown. However, multiples of each components and/or and their sub-components, might be used. The read apparatus 100" is analogous to the read apparatus(es) 100 and/or 100'. Consequently, similar components have analogous labels. The read apparatus 100" may be contained in a data storage device, such as a disk drive. Further, only a portion of the components of the read apparatus 100" are depicted.

The read apparatus 100" includes a shield structure 110', a read sensor 120, insulating layer 106, optional rear bias (not shown), a top shield 108', side magnetic bias structures 130 and shield reference bias structure 150' that are analogous to the read apparatus 100, the read sensor 120, the insulating layer 106, optional rear bias 140, media 102, top shield 108, side magnetic bias structures 130 and shield reference bias structure 150/150', respectively. Thus, the components depicted in FIG. 4 have an analogous structure and function to the corresponding components described above. For example, the sensor 120 is a free layer only sensor including the free layer 124 and nonmagnetic spacer layer 122. The read apparatus 100" may also be used with media (not shown) analogous to the media 102.

The shield 108' includes a ferromagnetic layer 143, a nonmagnetic layer 144, another ferromagnetic layer 146, an AFM layer 147 and a top shield 148. The magnetic layers 143 and 146 are antiferromagnetically coupled via an RKKY interaction. The ferromagnetic layer 146 is exchange coupled to the AFM layer 147. Thus, the shield 108' is an antiferromagnetically coupled shield. In other embodiments, the shield 108' may have a different structure.

The shield structure 110' includes a bottom shield 112, a shield pinning structure 114', a nonmagnetic coupling layer 116 and a shield reference structure 118'. The shield pinning structure 114' includes a pinning layer 160 and a ferromagnetic layer 162. The pinning layer 160 may be an AFM layer, such as IrMn. The magnetic layer 162 has its magnetic moment pinned by the exchange coupling with the pinning layer 160. The magnetic moment (arrow in the layer 162) of the ferromagnetic layer 162 of the shield pinning structure 114' may not be responsive to an external field, for example a field due to a media. Although shown as along the cross-track direction, the magnetic moment of the layer 162 may be canted from the cross-track direction.

The shield reference structure 118' includes two ferromagnetic layers 170 and 174 interleaved with and sandwiching a nonmagnetic layer 172. The magnetic moments of the ferromagnetic layers 170 and 174 are shown as arrows in the layers 170 and 174, respectively. Although shown as along the cross-track direction, the magnetic moments of the layers 170 and 174 may be canted from the cross-track direction. The nonmagnetic layer 172 may be a Ru layer. However, other material(s) might be used. The ferromagnetic layers 170 and 174 are termed reference layers because the orientation of the free layer magnetic moment with respect to the magnetic moment of the layer 170 results in the magnetoresistance of the read sensor 120. In some embodiments, the reference layer 170 is at least two nanometers and not more than ten nanometers thick. The reference layer 174 may have a thickness of at least three nanometers and not more than twenty nanometers. The thickness of the nonmagnetic layer 172 may be selected so that the reference layers 170 and 174 are antiferromagnetically coupled via a RKKY interaction. Thus, the coupling between the reference layers 170 and 174 may be relatively strong. In some embodiments, the reference layers 170 and 174 are antiferromagnetically coupled with a characteristic magnetic field strength of at least eight hundred and not more than two thousand Oe. The directions of the magnetic moments of the reference layers 170 and 174 may be responsive to an external field. For example, the permeability of the shield reference structure 118' may be at least five and not more than eight hundred.

The nonmagnetic coupling layer 116 has a thickness that may be used to set the strength of the coupling between the magnetic layer 162 and the magnetic layer 174. The magnetic coupling between the layers 162 and 174 is less than the magnetic coupling between the reference layers 170 and 174. For example, the magnetic layer 162 may be coupled with the reference layer 174 with a characteristic field strength of at least three hundred Oe and not more than one thousand five hundred Oe. Thus, the magnetic moments of the shield reference structure 118' are not completely pinned. The magnetic moments of the reference layers 172 and 174 are strongly coupled. However, the reference layer 174 is not strongly magnetically coupled to the layer 162. Thus, the magnetic moments of the reference layers 170 and 174, respectively, may be at least partially responsive to an external field. Thus, the reference layers 170 and 174 are part of the shield.

Although described as separate structures, the structures 114', 116 and 118' may be considered to form an antiferromagnetically coupled shield structure. Thus, the ferromagnetic layer 162 of the pinning structure 114' may be considered to be a third reference layer for the shield structure 110'. In such a shield structure 110', the third reference layer 162 is strongly coupled to the pinning layer 160. However, the second reference layer 174 is weakly coupled with the third reference layer 162.

The bias structures 158 and 150' bias the ferromagnetic layers 162, 174 and 170 of the shield reference structure 118' and the shield pinning structure 114'. The magnetic moments 151 of the bias layers 152 may magnetically bias the first reference layer 170. The magnetic moments 155 of the bias layers 154 may magnetically bias the second reference layer 174. The magnetic moments 159 of the shield pinning bias structure 158 may magnetically bias the third reference layer 162 of the shield pinning structure 114'.

The magnetic read apparatus 100" may share at least some of the benefits of the magnetic read apparatus(es) 100 and/or 100'. The magnetic read apparatus 100" may be suitable for use at higher linear densities. A characteristic magnetoresistance may be developed between the free layer 124 and the reference structure 118'. Thus, the magnetic read apparatus 100" is capable of reading data using a single free layer sensor 120. Because the magnetic moment(s) of the shield reference structure 118' also at least partially respond to an external field, the shield structure 110' may function as a shield. Consequently, the shield-to-shield spacing of the magnetic read apparatus 100" may be reduced. The presence of the side magnetic bias structures 130 and shield reference bias structures 150' may improve the stability of the sensor 120 and shield reference structure 118'. The equilibrium point of the read sensor 120 may be tuned using the bias structures 130, 150' and 158. Thus, the desired performance parameters may be better able to be achieved. Manufacturing and yield may also be improved. Consequently, the magnetic read apparatus 100" may be suitable for high linear and/or areal density magnetic recording applications, may have improved performance and may have improved manufacturability.

Figure 5A:
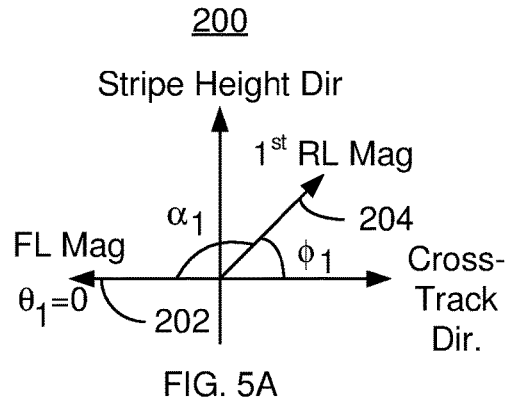
FIGS. 5A-5C depict an exemplary embodiment of the magnetic moments of the magnetic read apparatus without and with an external magnetic field.
Figure 5B:
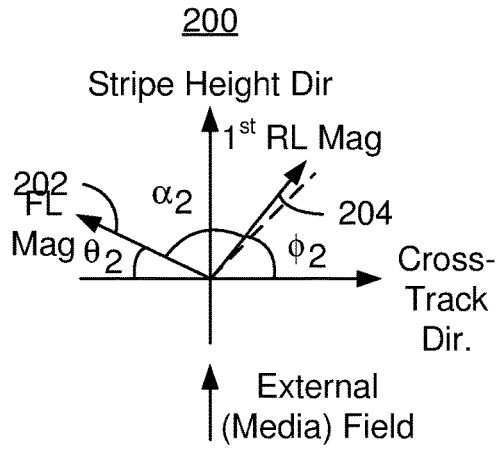
Figure 5C:
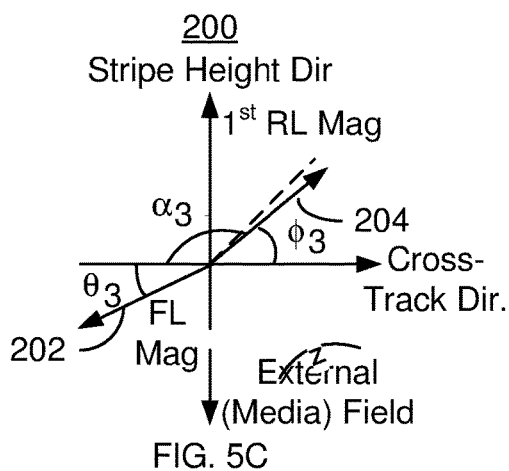

Operation of the magnetic read apparatus(es) 100, 100' and/or 100" may be understood with respect to FIGS. 5A-5C and FIGS. 6A-6C. FIGS. 5A, 5B and 5C are charts 200 depicting the magnetic moments of the free layer 120 and the first reference layer 170 with no external field, with an external field in one direction and with an external field in the opposite direction. Thus, FIGS. 5B and 5C may be viewed as depicting the influence of bits storing a logical "0" and a logical "1", respectively, or vice versa. FIGS. 5A-5C correspond to a read apparatus 100/100'/100" which does not have a rear bias 140, for which the rear bias is sufficiently weak or for which the magnetic apparatus 100/100'/100" is otherwise configured such that the free layer magnetic moment 202 is not canted from the cross-track direction when no external field is applied. In FIGS. 5A, 5B and 5C, the free layer magnetic moment is denoted by reference numeral 202, while the first reference layer 170 magnetic moment is denoted by the reference numeral 204.

In FIG. 5A, the free layer magnetic moment 202 is in the cross-track direction. Thus, the angle at which the free layer is canted from the cross-track direction, $\theta_1$, is zero. The first reference layer magnetic moment 204 is at an angle $\phi_1$, from the cross track direction. In some embodiments, $\phi_1$ is at least forty degrees and not more than fifty degrees. The first reference layer magnetic moment 204 may thus be directed at a nonzero angle from the ABS. Thus, the free layer magnetic moment 202 is at an angle $\alpha_1$ from the first reference layer magnetic moment 204 when no external field is applied.

FIG. 5B depicts the situation when the external field is in the stripe height direction (towards the ABS). Both the free layer magnetic moment 202 and the first reference layer magnetic moment 204 have responded to the external field. Thus, the free layer magnetic moment 202 is at a new angle, $\theta_2$ from the cross track direction. Similarly, the reference layer magnetic moment is at angle $\phi_2$ from the cross-track direction. In FIG. 5B, the dashed line denotes the orientation of the reference layer magnetic moment 204 without the external field. Thus, the free layer magnetic moment 202 may be seen as more free to change in response to the external magnetic field. The free layer magnetic moment 202 and the first reference layer magnetic moment 204 are at a new angle, $\alpha_2$, which is smaller than co. Therefore, the magnetoresistance of the read sensor 120 is different for the configuration shown in FIG. 5B than for the configuration shown in FIG. 5A.

FIG. 5C depicts the situation when the external magnetic field is in the opposite direction to that shown in FIG. 5B. Thus, the free layer magnetic moment 202 forms the angle $\theta_3$ with respect to the cross-track direction. The free layer magnetic moment 202 has again changed orientation due to the external field. Similarly, the first reference layer magnetic moment 204 has slightly changed orientation due to the external field. Thus, the magnetic moments 202 and 204 form angles $\theta_3$ and $\phi_3$, respectively, with the cross-track direction. The dashed line in FIG. 5C indicates the orientation of the first reference layer magnetic moment 204 in the absence of an external field. The free layer magnetic moment 202 and the first reference layer magnetic moment 204 form a new angle, $\alpha_3$. This angle is different from $\alpha_1$ and from $\alpha_2$. Because the magnetoresistance of the sensor 120 depends upon the angle between the free layer magnetic moment 202 and the reference layer magnetic moment 204, the sensor 120 has different magnetoresistances depending on the external field from the media. Thus, the magnetic read apparatus(es) 100, 100' and/or 100" may read data from the media. In addition, because the first reference layer magnetic moment 204 changes direction based on the applied field, the first reference layer 170 is part of the shield 110/110'. Consequently, the shield-to-shield spacing may be reduced. The benefits of the magnetic read apparatuses 100, 100' and/or 100" discussed above may, therefore, be achieved.

Figure 6A:
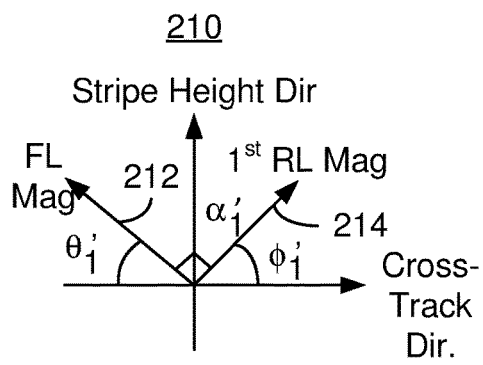
FIGS. 6A-6C depict another exemplary embodiment of the magnetic moments of the magnetic read apparatus without and with an external magnetic field.
Figure 6B:
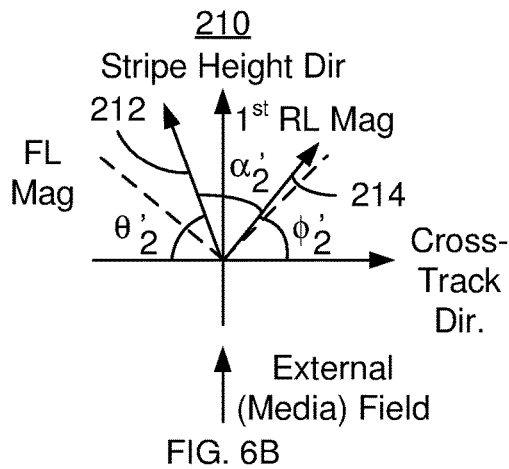
Figure 6C:
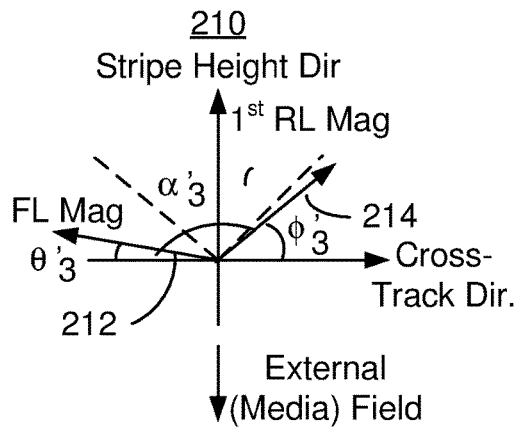

FIGS. 6A, 6B and 6C are charts 210 depicting the magnetic moments of the free layer 120 and the first reference layer 170 with no external field, with an external field in one direction and with an external field in the opposite direction. Thus, FIGS. 6B and 6C may be viewed as depicting the influence of bits storing a logical "0" and a logical "1", respectively, or vice versa. FIGS. 6A-6C correspond to a read apparatus 100/100'/100" which has a rear bias 140 that is sufficiently strong or the read apparatus 100/100'/100" is otherwise configured such that the free layer magnetic moment 202 is canted from the cross-track direction when no external field is applied. For example, the magnetic bias structure 130 and, in some embodiments, 150/150' and 158 provide a bias that is canted from the cross-track direction. In FIGS. 6A, 6B and 6C, the magnetic moment of the free layer 124 is denoted by reference numeral 212, while the magnetic moment of the first reference layer 170 is denoted by the reference numeral 214.

In FIG. 6A, the free layer magnetic moment 212 is canted from the cross-track direction by an angle, $\theta_1'$. The first reference layer magnetic moment 214 is at an angle $\phi_1'$, from the cross-track direction. In some embodiments, $\phi_1'$ is at least forty degrees and not more than fifty degrees. The first reference layer magnetic moment 214 may thus be directed at an angle from the ABS. Thus, the free layer magnetic moment 212 is at an angle $\alpha_1'$ from the first reference layer magnetic moment 214 when no external field is applied. In the embodiment shown, $\alpha_1'$ is ninety degrees. However, other values are possible.

FIG. 6B depicts the situation when the external field is in the stripe height direction (towards the ABS). Both the free layer magnetic moment 212 and the first reference layer magnetic moment 214 have responded to the external field. Thus, the free layer magnetic moment 212 is at a new angle, $\theta_2'$ from the cross track direction. Similarly, the reference layer magnetic moment is at angle $\phi_2'$ from the cross-track direction. In FIG. 6B, the dashed line denotes the orientation of the magnetic moment 214 without the external field. Thus, the free layer magnetic moment 212 may be seen as more free to change in response to the external magnetic field. The free layer magnetic moment 212 and the first reference layer magnetic moment 214 are at a new angle, $\alpha_2'$ which is smaller than $\alpha_1'$.

FIG. 6C depicts the situation when the external magnetic field is in the opposite direction to that shown in FIG. 6B. Thus, the free layer magnetic moment 212 forms the angle $\theta_3'$ with respect to the cross-track direction. The free layer magnetic moment 212 has again changed orientation due to the external field. Similarly, the first reference layer magnetic moment 201 has slightly changed orientation due to the external field. Thus, the magnetic moments 212 and 214 form angles $\theta_3'$ and $\phi_3'$, respectively, with the cross-track direction. The dashed line in FIG. 6C indicates the orientation of the first reference layer magnetic moment 214 in the absence of an external field. The free layer magnetic moment 212 and the first reference layer magnetic moment 214 form a new angle, $\alpha_3'$. This angle is different from $\alpha_1'$ and from $\alpha_2'$. Because the magnetoresistance of the sensor 120 depends upon the angle between the free layer magnetic moment 212 and the reference layer magnetic moment 214, the sensor 120 has different magnetoresistances depending on the external field from the media. Thus, the magnetic apparatus 100, 100' and/or 100" may read data from the media. In addition, because the first reference layer magnetic moment 214 changes based on the applied field, the first reference layer 170 is part of the shield 110/110'. Consequently, the shield-to-shield spacing may be reduced. The benefits of the magnetic apparatus(es) 100, 100' and/or 100" discussed above may, therefore, be achieved.

Various features of the magnetic recording apparatuses 100, 100' and 100" have been depicted and described herein. One of ordinary skill in the art will recognize that these features may be combined in other manners not explicitly disclosed herein.

Figure 7:
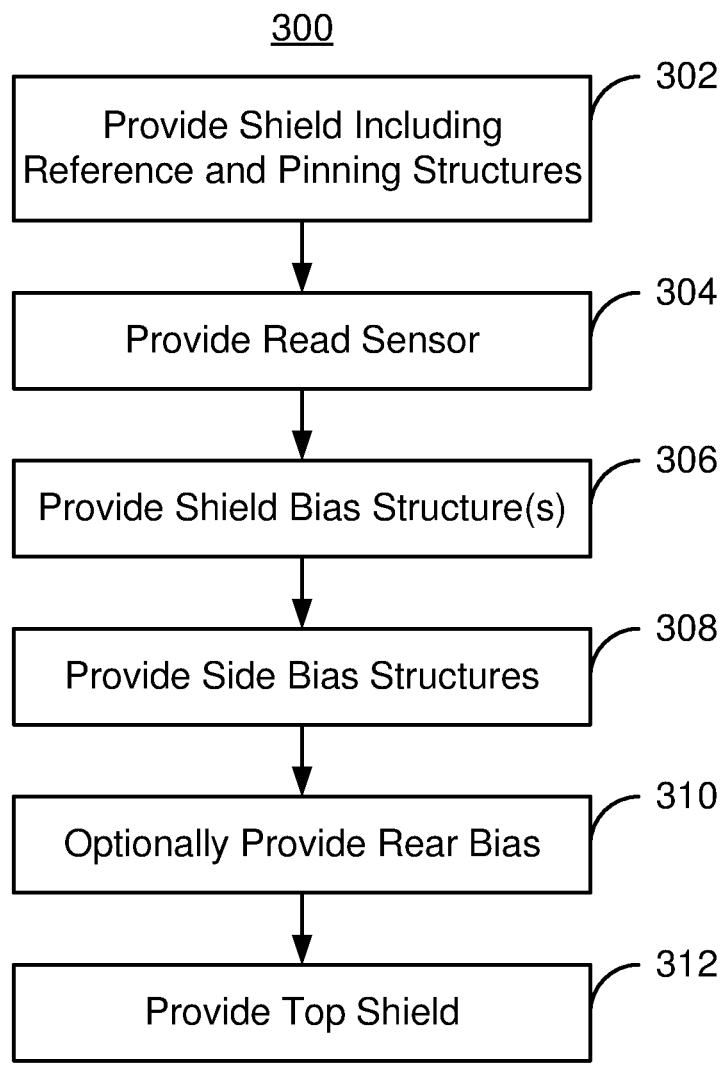
FIG. 7 is a flow chart depicting an exemplary embodiment of a method for providing a magnetic read apparatus.

FIG. 7 depicts an exemplary embodiment of a method 300 for providing a magnetic read apparatus such as the magnetic read apparatus 100, 100' and/or 100". For simplicity, some steps may be omitted, interleaved, combined and/or include substeps. The method 300 is described in the context of providing the magnetic read apparatus 100. The method 300 may also be used to fabricate other magnetic recording apparatuses including but not limited to the magnetic read apparatuses 100' and/or 100". The method 300 is described in the context of a single device but may be used to fabricate multiple magnetic storage apparatuses at substantially the same time. The method 300 is also described in the context of particular layers. A particular layer may include multiple materials and/or multiple sub-layers. The method 300 also may start after formation of other portions of the magnetic recording apparatus.

The shield structure 110 is provided, via step 302. Step 302 may include fabricating the shield pinning structure 114, the nonmagnetic layer 116 and the shield reference structure 118. Edges of the shield structure 110 may also be defined in step 302.

The read sensor 120 is fabricated, via step 304. Thus, step 304 includes depositing the nonmagnetic layer 122, the free layer 124 and, optionally, capping layer 126 as well as defining the edges of the layers 122, 124 and 126.

The shield bias structures 150 and, optionally, 158, are provided, via step 306. Step 306 may include depositing the layers 158, 156, 154, 153 and 152 on the sides of the structures 110/110'. Step 306 may also include providing insulating layer 106 prior to deposition of the structures 150/150' and 158.

The magnetic side bias structures 130 may optionally be provided, via step 308. The rear bias structure 140 may optionally be formed, via step 310. The top shield 108/108' may also be formed, via step 312. This step may include depositing a monolithic shield or providing a multilayer shield. In some embodiments, the shield 108' may be an AFC coupled shield.

Using the method 300, the magnetic read apparatus 100, 100' and/or 100" may be provided. Thus, a read apparatus that has a reduced shield-to-shield spacing and a reduced spacing between sensors, improved manufacturability and improved performance may be provided. Thus, performance of the read apparatus 100/100'/100" may be improved.

Figure 8:
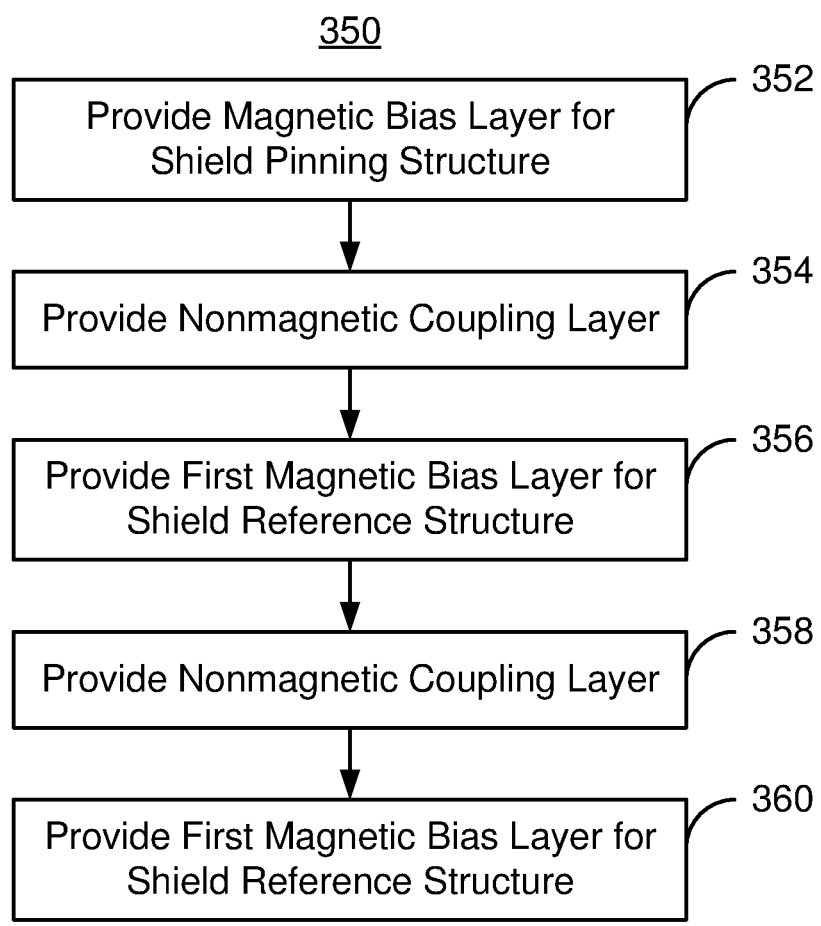
FIG. 8 is a flow chart depicting an exemplary embodiment of a method for providing a bias structure of a magnetic read apparatus.

FIG. 8 depicts an exemplary embodiment of a method 350 for providing shield bias structure(s) in a magnetic read apparatus such as the magnetic read apparatus 100'. For simplicity, some steps may be omitted, interleaved, combined and/or include substeps. The method 350 is thus described in the context of providing the bias structures 150' and 158 of the magnetic read apparatus 100'. The method 350 may also be used to fabricate other shield bias structures including but not limited to the shield bias structure 150. The method 350 is described in the context of a single device but may be used to fabricate multiple magnetic storage apparatuses at substantially the same time. The method 350 is also described in the context of particular layers. A particular layer may include multiple materials and/or multiple sub-layers. The method 350 also may start after formation of other portions of the magnetic recording apparatus. For example, the method 350 may commence after the insulating layer 106 is formed.

The shield pinning bias structures 158 are provided, via step 352. Step 352 may include depositing a multilayer. In other embodiments, step 352 may be omitted. The nonmagnetic coupling layer 156 may optionally be provided after the shield pinning bias structure 158, via step 354.

The shield reference bias structures 150' are provided using steps 356, 358 and 360. The bias layers 154 are provided, via step 356. The nonmagnetic coupling layers 153 may be provided, via step 358. The bias layers 152 are provided, via step 360. Steps 356, 358 and 360 may include depositing the material(s) for the layers 154, 153 and 152, then defining the edges of the layers 154, 153 and 152.

Using the method 350, the shield reference bias structure 150' and/or 150 may be provided. The method 350 may also form the shield pinning bias structure 158 and nonmagnetic coupling layer 156. Thus, a read apparatus that has a reduced shield-to-shield spacing and improved biasing may be provided. Because the method 350 forms the shield biasing structures 150/150' and 158, the biasing of the sensor 120 may be better tailored. Further, greater variations in fabrication of the shield structure 110/110' and the sensor 120 may be allowed. Thus, performance and manufacturability of the read apparatus 100/100' may be improved.

Figure 9:
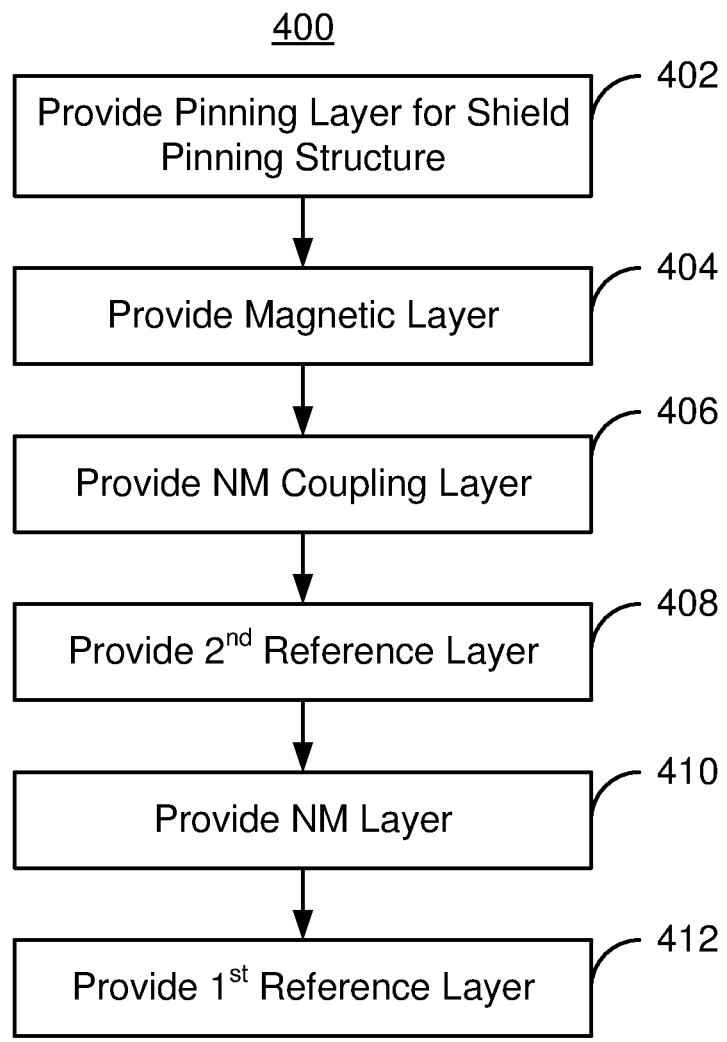
FIG. 9 is a flow chart depicting an exemplary embodiment of a method for providing a shield structure of a magnetic read apparatus.

FIG. 9 depicts an exemplary embodiment of a method 400 for providing a shield structure in a magnetic read apparatus such as the magnetic read apparatus 100". For simplicity, some steps may be omitted, interleaved, combined and/or include substeps. The method 400 is thus described in the context of providing the shield structure 110' of the magnetic read apparatus 100'. The method 400 may also be used to fabricate other shield structures including but not limited to the shield structure 110. The method 400 is described in the context of a single device but may be used to fabricate multiple magnetic storage apparatuses at substantially the same time. The method 400 is also described in the context of particular layers. A particular layer may include multiple materials and/or multiple sub-layers. The method 400 also may start after formation of other portions of the magnetic recording apparatus.

Steps 402 and 404 form the pinning structure 118'. Thus, the pinning layer 160 is provided, via step 402. The third reference layer 162 is provided, via step 404. In some embodiments, step 404 is performed such that the third reference layer 162 adjoins the pinning layer 160. Step 404 may include depositing multiple layers. The nonmagnetic coupling layer 116 is provided, via step 406. Step 406 includes depositing the desired nonmagnetic material(s) such as Ru to a particular thickness. The thickness of the nonmagnetic coupling layer 116 is set such that the reference layers 162 and 174 are weakly magnetically coupled as described above.

Steps 408 through 412 are used to fabricate the shield reference structure 118'. Thus, the second reference layer 174 is provided, via step 408. Step 408 may include depositing multiple magnetic layers. The nonmagnetic layer 172 is provided, via step 410. Step 410 includes depositing the desired nonmagnetic material(s) such as Ru to a thickness desired for AFM coupling between the reference layers 170 and 174. The first reference layer 174 is provided, via step 412. Step 412 may include depositing multiple magnetic layers. Thus, the shield structures 114' and 118' and the nonmagnetic coupling layer 116 may be as shown in FIG. 4.

Using the method 400, the shield structure 110' and/or 110 may be provided. Thus, a read apparatus that has a reduced shield-to-shield spacing and a reduced spacing between sensors may be provided. Thus, performance of the read apparatus 100/100'/100" may be improved.

Using the methods 300, 350 and/or 400, the magnetic read apparatus 100, 100' and/or 100", the shield structure 110/110', the shield reference bias structure 150/150', the shield pinning bias structure 158 and the free layer only read sensor 120 may be provided. Thus, the read apparatus 100, 100' and/or 100" having improved performance at higher density be fabricated.

What is claimed is:

1. A magnetic read apparatus comprising:
   a read sensor comprising a free layer; and
   a shield structure adjacent to the free layer in a down-track direction that is parallel to a media facing surface, wherein the shield structure comprises:
     a shield pinning structure,
     a shield reference structure, and
     a nonmagnetic coupling layer between the shield reference structure and the shield pinning structure,
   wherein the shield reference structure comprises:
     a first reference layer,
     a second reference layer, and
     a nonmagnetic layer between the first reference layer and the second reference layer in the down-track direction, the first reference layer being antiferromagnetically coupled to the second reference layer; and
   wherein the shield pinning structure comprises a pinning layer and a third reference layer magnetically coupled to the pinning layer.

2. The magnetic read apparatus of claim 1 wherein the shield reference structure has a permeability of at least five and not more than eight hundred.

3. The magnetic read apparatus of claim 1, further comprising a shield reference bias structure adjacent to the shield reference structure in a cross track direction that is parallel to the media facing surface and separated from the shield reference structure by an insulating layer, wherein the shield reference bias structure comprises:
   a first bias layer for biasing the first reference layer in a first direction; and
   a second bias layer for biasing the second reference layer in a second direction, the first bias layer being antiferromagnetically coupled with the second bias layer.

4. The magnetic read apparatus of claim 3 wherein the shield reference bias structure further comprises another nonmagnetic coupling layer between the first bias layer and the second bias layer.

5. The magnetic read apparatus of claim 1, further comprising a shield pinning bias structure adjacent to the shield pinning structure in a cross track direction that is parallel to the media facing surface and separated from the shield pinning structure by an insulating layer.

6. The magnetic read apparatus of claim 1 further comprising:
   a rear magnetic bias structure for magnetically biasing the read sensor in a stripe height direction perpendicular to the media facing surface, the read sensor being between the media facing surface and at least a portion of the rear magnetic bias structure.

7. The magnetic read apparatus of claim 6 further comprising:
   an insulating nonmagnetic layer between the read sensor and the rear magnetic bias structure.

8. A magnetic read apparatus comprising:
   a read sensor;
   a shield structure adjacent to the read sensor in a down-track direction that is parallel to a media facing surface, wherein the shield structure comprises a shield pinning structure and a shield reference structure separated by a first nonmagnetic coupling layer; and a shield reference bias structure adjacent to the shield reference structure in a cross-track direction that is parallel to the media facing surface, wherein the shield reference bias structure comprises:
- a first ferromagnetic bias layer;
- a second ferromagnetic bias layer; and
- a second nonmagnetic coupling layer between the first ferromagnetic bias layer and the second ferromagnetic bias layer.

9. The magnetic read apparatus of claim 8, further comprising a shield pinning bias structure adjacent to the shield pinning structure in the cross-track direction.

10. The magnetic read apparatus of claim 9, further comprising a third nonmagnetic coupling layer between the shield reference bias structure and the shield pinning bias structure.

11. The magnetic read apparatus of claim 8, wherein the first ferromagnetic bias layer is configured to bias a portion of the shield reference structure in a first direction and the second ferromagnetic bias layer is configured to bias a remaining portion of the shield reference structure in a second direction.

12. The magnetic read apparatus of claim 8, wherein the shield reference structure comprises a first ferromagnetic layer, a second ferromagnetic layer, and a nonmagnetic layer between the first ferromagnetic layer and the second ferromagnetic layer in the down-track direction.

13. The magnetic read apparatus of claim 8, wherein the shield pinning structure comprises a pinning layer and a ferromagnetic layer.

14. The magnetic read apparatus of claim 8, wherein the read sensor comprises a free layer separated from the shield reference structure by a nonmagnetic spacer layer in the down-track direction.

15. The magnetic read apparatus of claim 14, further comprising a side bias structure adjacent the free layer in the cross-track direction.

16. The magnetic read apparatus of claim 8, further comprising an insulating layer between the shield reference bias structure and the shield reference structure.

17. A magnetic apparatus comprising:
- a read sensor;
- a shield structure adjacent to the read sensor in a down-track direction that is parallel to a media facing surface, wherein the shield structure comprises a shield pinning structure and a shield reference structure separated by a first nonmagnetic coupling layer;
- a shield reference bias structure adjacent to the shield reference structure in a cross-track direction that is parallel to the media facing surface;
- a shield pinning bias structure adjacent to the shield pinning structure in the cross-track direction; and
- a side bias structure adjacent to the read sensor in the cross track direction.

18. The magnetic apparatus of claim 17, wherein the shield reference bias structure and the shield pinning bias structure are separated by a nonmagnetic coupling layer in the down-track direction, and wherein the shield reference bias structure, the shield pinning bias structure, and the side bias structure are separated from the read sensor and the shield structure by an insulating layer.

19. The magnetic apparatus of claim 17, wherein the shield reference bias structure comprises:
- a first ferromagnetic bias layer;
- a second ferromagnetic bias layer; and
- a second nonmagnetic coupling layer between the first ferromagnetic bias layer and the second ferromagnetic bias layer.

* * * * *